US012614363B2

(12) United States Patent
Demir et al.

(10) Patent No.: US 12,614,363 B2
(45) Date of Patent: Apr. 28, 2026

(54) SYSTEMS AND METHODS FOR ADJUSTING A USER POSITION IN VIRTUAL REALITY

(71) Applicant: Rockwell Automation Technologies, Inc., Mayfield Heights, OH (US)

(72) Inventors: Mustafa Demir, Reading (GB); Simon Blackwell, Kiln Farm (GB); Ross Manson, Reading (GB)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 310 days.

(21) Appl. No.: 18/137,293

(22) Filed: Apr. 20, 2023

(65) Prior Publication Data

US 2024/0355076 A1 Oct. 24, 2024

(51) Int. Cl.
| | |
|---|---|
| *G06T 19/20* | (2011.01) |
| *G06F 3/01* | (2006.01) |
| *G06T 7/20* | (2017.01) |
| *G06V 10/74* | (2022.01) |

(52) U.S. Cl.
CPC .............. *G06T 19/20* (2013.01); *G06F 3/017* (2013.01); *G06T 7/20* (2013.01); *G06V 10/761* (2022.01); *G06T 2219/2004* (2013.01); *G06T 2219/2016* (2013.01)

(58) Field of Classification Search
CPC ... G06T 19/20; G06T 7/20; G06T 2219/2004; G06T 2219/2016; G06F 3/017; G06F 3/0304; G06V 40/28
See application file for complete search history.

(56) References Cited

U.S. PATENT DOCUMENTS

| | | | | |
|---|---|---|---|---|
| 11,409,364 B2 * | 8/2022 | Zhou | .................... | G06F 3/0304 |
| 11,461,973 B2 * | 10/2022 | Pinchon | ............. | G06F 3/04815 |
| 2020/0296350 A1 * | 9/2020 | Oh | ....................... | H04N 13/194 |

FOREIGN PATENT DOCUMENTS

| | | | | |
|---|---|---|---|---|
| CN | 108073267 B | * 6/2020 | ............. | G06F 3/011 |
| WO | WO-2021231128 A1 | * 11/2021 | ........... | H04N 23/683 |

* cited by examiner

*Primary Examiner* — Tammy Paige Goddard
*Assistant Examiner* — Shirley Diane Patience
(74) *Attorney, Agent, or Firm* — Fletcher Yoder, P.C.

(57) ABSTRACT

A method includes using at least one processor to display image data to a user via an electronic device based on a three-dimensional (3D) user coordinate in a 3D coordinate system. Further, the method includes detecting a first gesture associated with an extremity of the user and a first 3D coordinate of the 3D coordinate system, detecting a movement of the extremity in the 3D coordinate system, from the first 3D coordinate to a second 3D coordinate of the 3D coordinate system, and generating a vector based on the movement, a distance between the first 3D coordinate and the second 3D coordinate, and direction of the movement. The method also includes adjusting the 3D user coordinate based on the vector and modifying the image data based on the adjusted 3D user coordinate.

20 Claims, 5 Drawing Sheets

SYSTEMS AND METHODS FOR ADJUSTING A USER POSITION IN VIRTUAL REALITY

BACKGROUND

The present disclosure generally relates to virtual reality systems. More particularly, embodiments of the present disclosure are related to systems and methods for manipulating the movement and/or rotation of a user in a virtual environment.

For many industrial systems, virtual reality (VR) and augmented reality (AR) environments may provide opportunities to interact with a conceptual industrial system before engaging with a physical one. The VR environment, for example, may contain three-dimensional (3D) images of virtual industrial automation devices and a virtual industrial automation environment displayed to a user that correspond to physical industrial automation devices and a physical industrial automation environment. In this way, the user may be presented with a virtual representation of an existing industrial system. By using a VR environment, the user may be able to manipulate the virtual industrial automation devices in ways that the physical industrial automation devices could not be easily manipulated. With this in mind, it may be desired for VR devices to have improved methods for manipulating the movement and/or rotation of the user within the virtual representation of the existing industrial system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method includes displaying, via at least one processor, image data to a user via an electronic device based on a three-dimensional (3D) user coordinate in a 3D coordinate system. The method also includes detecting, via the at least one processor, a first gesture associated with an extremity of the user and a first 3D coordinate of the 3D coordinate system and detecting, via the at least one processor, a movement of the extremity in the 3D coordinate system from the first 3D coordinate to a second 3D coordinate of the 3D coordinate system. Further, the method includes generating, via the at least one processor, a vector based on the movement, a distance between the first 3D coordinate and the second 3D coordinate, and direction of the movement. Even further, the method includes adjusting, via the at least one processor, the 3D user coordinate based on the vector, and modifying, via the at least one processor, the image data based on the adjusted 3D user coordinate.

In another embodiment, a tangible, non-transitory, computer-readable medium configured to store instructions executable by at least one processor in a computing device, wherein the instructions are configured to cause the at least one processor to display image data to a user via an electronic device based on a 3D user coordinate in a 3D coordinate system. The operations also include detect a first gesture associated with a first 3D coordinate of the 3D coordinate system, detect a second gesture associated with a second 3D coordinate of the 3D coordinate system, and generate a vector based on a distance and direction between the first 3D coordinate and the second 3D coordinate. The operations also include adjust the 3D user coordinate based on the vector and modify the image data based on the adjusted 3D user coordinate.

In yet another embodiment, a system includes an image sensor configured to capture the image data, wherein the image data includes one or more industrial devices in an industrial system. The system also includes a computing device configured to generate a virtual 3D environment based on the image data. Further, the system includes a processor configured to perform operations including displaying the image data to a user via an electronic device based on a 3D user coordinate in a 3D coordinate system. Even further, the processor is configured to perform operations including detecting a first gesture associated with a first 3D coordinate of the 3D coordinate system, detecting a second gesture associated with a second 3D coordinate of the 3D coordinate system, and generating a vector based on a distance and direction between the first 3D coordinate and the second 3D coordinate. The processor is also configured to perform operations including adjusting the 3D user coordinate based on the vector and modifying the image data based on the adjusted 3D user coordinate.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION DRAWINGS

DETAILED DESCRIPTION

Figure 1:
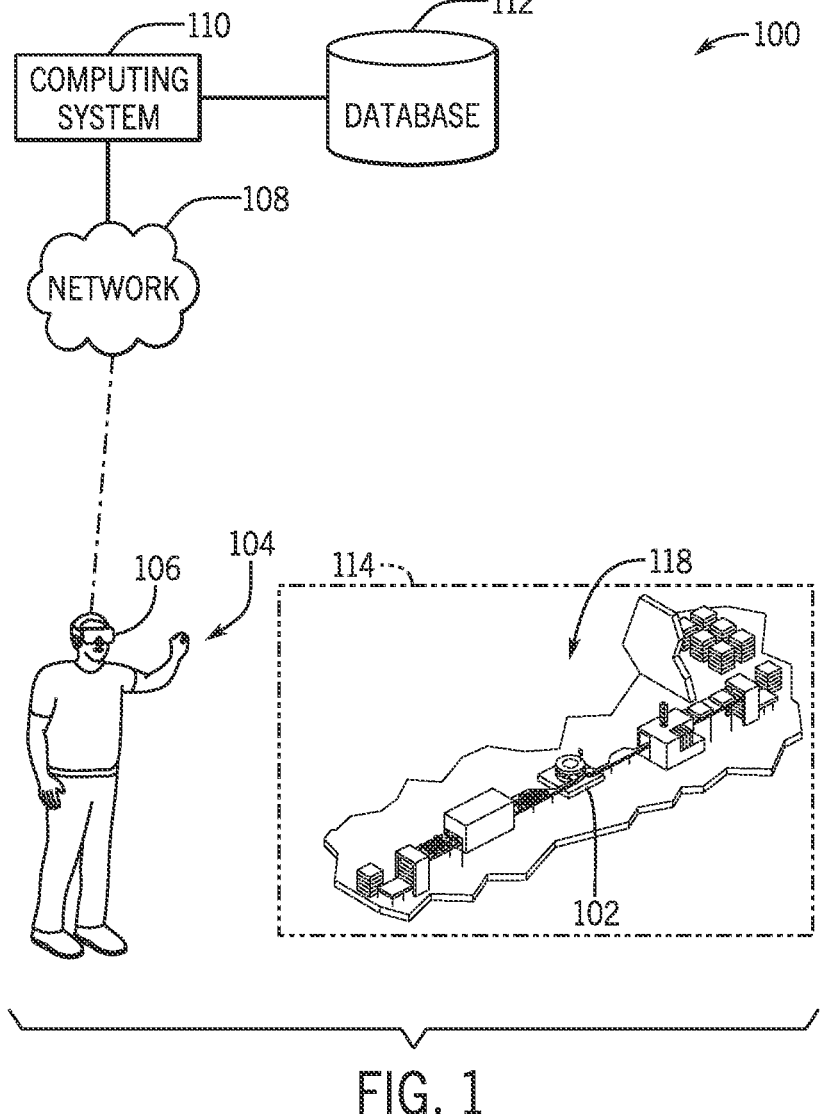
FIG. 1 is a block diagram of an exemplary embodiment of a virtual reality (VR) system that may be utilized by a remote user to display and interact with a VR representation of an industrial system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Interacting with industrial systems through virtual reality (VR) environments allow the user to visualize, alter, test, and/or optimize the position of virtual industrial automation devices without involving the labor and time needed to perform those same actions on physical industrial automation devices. As a result, VR environment interaction provides a more cost-effective method of planning and developing a strategy for working with industrial systems prior to implementing the strategy. Despite the apparent benefits, challenges remain for users interacting with the VR environment. Oftentimes, the movement of virtual objects within the VR environment is limited to particular user interfaces that may reduce the accuracy, precision, and responsiveness of the desired motion of the virtual object in the VR environment. If the user cannot properly position them or virtual objects within the VR environment, the experience may be cumbersome and inefficient compared to other methods of industrial system management. Movement of virtual objects are often addressed with controller inputs that use multiple axes to simulate movement and rotation within the VR environment. However, to provide a more user-friendly intuitive manner in which to interact with the VR application, hand tracking features may be used to supplement the lack of controller input for movement. Some VR applications may involve moving the user's position within the VR environment after the user makes a running motion with their hands, thereby causing a teleporting phenomenon within the VR environment. However, constantly making any motion can tire a user out and limit the movement to one direction. These limitations of movement may be cumbersome and make the VR systems difficult to utilize to their full potential.

With this in mind, the virtual reality system of the present disclosure may include an electronic device that may display image data to the user based on the user coordinate within a three-dimensional coordinate system (e.g., a 3D user coordinate). In some embodiments, the electronic device may be a VR headset, which may include gyroscopic controls used to change a location and perspective of the image data based on the head location and the head perspective of the user. The electronic device may also be any display device used to present image data to the user. The perspective and location of the user's position within the VR environment may not be stagnant, and oftentimes users may wish to move positions within the VR environment in order to move closer or further away from virtual objects, thereby altering the image data being displayed to the user. For example, upon entering the VR environment, the user may be assigned a first 3D user coordinate in the 3D coordinate system with a corresponding first location and a first perspective within the VR environment. The image data displayed to the user may be associated with the first location and the first perspective. After the user moves positions within the VR environment, the first user coordinate may be adjusted to a second user coordinate, and a second location and a second perspective within the VR environment associated with the second user coordinate may be generated. The image data displayed to the user may then be associated with the second user coordinate. In this way, the user is displayed image data indicative of the current location and current perspective of their coordinate within the 3D coordinate system associated with the VR environment.

To allow for a more intuitive and comprehensive movement and rotation control scheme in a VR environment, the presently disclosed embodiments detail employing a virtual reality system to manipulate both the movement and rotation of a user within the VR environment. The virtual reality system may detect gestures that may include, but are not limited to, pulling, pushing, pinching, releasing, grabbing, pointing, twisting, and the like. As such, different gestures can be assigned and reassigned to perform various functions for the user while within the VR environment. The virtual reality system may detect a first gesture that is indicative of a first 3D coordinate within the 3D coordinate system. For example, the user may pinch their thumb and their index finger together. Upon detecting that the user has made the first gesture, the system may record the location of the first 3D coordinate within the 3D environment that the first gesture was performed. The user may then perform a second gesture that is indicative of a movement towards a second 3D coordinate within the 3D coordinate system. For example, the user may pull their hand away from the first 3D point, generating a pull gesture. Upon detecting a second gesture, the virtual reality system may generate a vector that is associated with the magnitude and direction between the first 3D coordinate and the second 3D coordinate. For example, the user may pinch in the space before them and pull their hand back to their chest. The vector would extend from the first 3D coordinate to the second 3D coordinate, and have a direction (e.g., directed from the initial pinch location to the chest of the user) and length (e.g., the distance between the initial pinch location and the chest of the user.)

Upon generating the vector, the virtual reality system may associate the direction and length of the vector with a change in position of the 3D user coordinate within the 3D coordinate system. In some embodiments, the distance of the vector may indicate the speed at which the 3D user coordinate changes within the 3D coordinate system. For example, if the first gesture and the second gesture are both detected closely to one another, the user may move in the desired direction at a lower speed than if the first gesture and the second gesture were detected a larger distance away from one another. In some embodiments, the generated vector may adjust the 3D coordinate both through translation through the 3D coordinate system and through rotation. For example, by performing the first gesture with a left hand of the user, the 3D user coordinate may be rotated about a fixed point, whereas performing the first gesture with a right hand of the user prompts the 3D coordinate system to translate the 3D user coordinate while restricting along an axis of rotation. In some embodiments, the user may rotate and translate the 3D user coordinate simultaneously. For example, the user may be able to perform the first gesture with their left hand and then perform the first gesture with their right hand as well. In this way, the user may generate a first and a second vector, where the first vector is associated with the translation of the user 3D coordinate and the second vector is associated with the rotation of the user 3D coordinate.

The image data displayed to the user may be modified based on the adjusted user 3D coordinate. The 3D coordinate system may be associated with the VR environment, such that translation and rotation within the 3D coordinate system corresponds to movement and rotation within the VR environment. For example, if the 3D user coordinate translates 30 units and rotates 90 units to the left, the image data displayed to the user may depict moving through the VR environment 30 units and rotating 90 degrees to the left. Through the use of the present disclosure, moving within a VR environment may be accomplished without requiring the user to hold a physical controller, instead allowing their body to act as a means of moving and rotating in order to visualize the VR environment. In this way, the corresponding image data displayed to the user may be received intuitively and without the strain and limitation placed on movement with traditional VR systems. It should be noted that although the virtual reality system is described with respect to the VR environment, in some embodiments, it may be used in an augmented reality (AR) environment. Additional details regarding the embodiments presented above will be detailed below with reference to FIGS. 1-5.

By way of introduction, FIG. 1 is a block diagram of a virtual reality system 100 that may be utilized by a remote user 104 to display a visualization 114 that includes a 3D device visualization 102 of a real-world, industrial automation device, a 3D visualization of the real-world environment of the real-world industrial automation device, a 3D visualization 118 of a real-world, an industrial system, or a combination thereof, in a virtual reality (VR) environment. The remote user 104 may be located in an area geographically remote or different from the location of the real-world, industrial system. For example, the remote user 104 may be located in an office building while the industrial system may be located in an industrial facility in a different location (e.g., in another continent, another country, another geographical region, another state, another city, etc.). In some embodiments, the visualization 114 may include one or more 3D device visualizations 102 of the industrial automation devices, one or more regions of the VR visualization, or the entire VR visualization 118 of the industrial system.

In the illustrated embodiment, the VR environment may refer to the visualization 114 that includes a combination of computer-generated and/or real-world content displayed to the remote user 104 via a head mounted device 106 of the virtual reality system 100. Although the head mounted device 106 is employed within the illustrated embodiment of the virtual reality system 100, it should be noted that, in other embodiments, other suitable types of displays may be employed by the virtual reality system 100. For example, the virtual reality system 100 may employ smart glasses, a virtual retinal display, one or more contact lenses, a computer, a mobile device, or any other suitable electronic display device for displaying visualizations to a user 104. In any case, the head mounted device 106 may display the visualization 114 that includes the VR device visualization 102 or the VR visualization 118 of the industrial system to the remote user 104. Additional details with regard to the head mounted device 106 may be discussed below with reference to FIG. 2.

The virtual reality system 100 may display the VR device visualization 102 of the industrial automation device or the VR visualization 118 of the industrial system in various perspectives to the remote user 104. In the illustrated embodiment, for example, the virtual reality system 100 may display the VR visualization 118 to the remote user 104 as a VR representation that the remote user 104 may interact with. For example, the remote user 104 may perform various gestures a move command and/or a rotate command. In another embodiment, the virtual reality system 100 may virtually position the remote user in the VR visualization 118 of the industrial system such that the remote user 104 may acquire a first-person perspective of the VR visualization 118 and interact with or navigate through (e.g., walk around or move around) the VR visualization 118. Additional details with regard to the display of the first-person perspective of the VR visualization 118 and the remote user's interactions with and navigation through the VR visualization 118 may be discussed below with reference to FIGS. 3-5.

In the illustrated embodiment, the VR visualization 118 includes various industrial automation devices associated with a manufacturing or assembly line. However, it should be noted that the illustrated embodiment is intended to be non-limiting and that the virtual reality system 100 may display a 3D representations of other industrial automation devices, or parts thereof, that may be employed within other real-world, industrial systems. For example, the industrial automation devices may include controllers, input/output (I/O) modules, motor control centers, motors, valves, actuators, temperature elements, pressure sensors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.), data centers, conveyor sections, movers, and the like.

In some embodiments, the computing system 110 may receive image data of the real-world, industrial system from an imaging system. The imaging system is communicatively coupled to the computing system 110. The imaging system may include image acquisition hardware or devices (e.g., one or more cameras) positioned within the real-world, industrial system. After the imaging system acquires image data associated with the real-world, industrial system, the imaging system may send the image data to the computing system 110. The image acquisition hardware or devices may also include infrared cameras or multipurpose cameras that may acquire thermal data or other suitable types of data of industrial automation devices in the industrial system or regions of the industrial system.

The computing system 110 may process the image data (e.g., stitch images together, triangulate features found in multiple images, etc.) to generate 3D video (e.g., volumetric video) based on the image data received from the imaging system. For example, the computing system 110 may process the image data received from the imaging system and generate a 3D point cloud based on the image data associated with the real-world, industrial system or one or more real-world, industrial automation devices in the real-world, industrial system. The 3D point cloud may be utilized by the virtual reality system 100 to generate 3D surfaces of the industrial automation devices or the industrial system associated with the 3D point cloud. In some embodiments, the computing system 110 may store the generated 3D video in a database 112 communicatively coupled to the computing system 110. For example, the 3D video may be indexed by an identifier indicative of an industrial automation device, a region of the industrial system, or the industrial system associated with the 3D video. Additionally, the identifier may include a timestamp indicative of the date and time the 3D video was generated by the computing system 110 or stored in the database 112. The virtual reality system 100 may then generate a 3D visualization 188 of the industrial system based on the 3D video received from the computing system 110 and display the visualization 114 to the remote user 104 via the head mounted device 106.

Additionally, the computing system 110 may enhance the generated 3D video based on computer-aided-design (CAD) drawings associated with the industrial system 119 or one or more industrial automation devices 103 in the industrial system. For example, the 3D video may be utilized by the computing system 110 to generate virtual representations of industrial automation devices, a virtual representation of the industrial system, or portions thereof, that may be manipulated and interacted with by the remote user 104. For example, after a virtual representation of an industrial automation device that incorporates the 3D video is displayed in the visualization 114 to the remote user 104, the remote user 104 may open the virtual representation of the industrial automation device to view and interact with interior components of the virtual representation of the industrial automation device.

As the remote user 104 interacts with or navigates through the 3D visualization 118, the virtual reality system 100 may update or modify the 3D visualization 118. After detecting the remote user's interactions with or navigation through the 3D visualization 118, the virtual reality system 100 may send a request to the computing system 110 for additional 3D video associated with the real-world, industrial system 119 or one or more real-world industrial automation devices. For example, the head mounted device 106 may detect the remote user's interaction (e.g., via a gesture or voice command) with the 3D visualization 118 to view a desired region of the 3D visualization 118 (e.g., a non-rendered region) that is different than the region of the 3D visualization 118 presently displayed to the remote user 104. The head mounted device 106 may then send a request to the computing system 110 for additional 3D video associated with the desired region of the 3D visualization 118. For example, the request may include identification data associated with a particular industrial automation device or the desired region of the 3D visualization 118. The computing system 110 may then transmit the request to the imaging system 116 to acquire image data associated with the desired region of the real-world industrial system. Based on the request, the imaging system may send a command signal to one or more mobile cameras to acquire the requested image data. In some embodiments, the imaging system may send a command signal to the mobile cameras to reposition and/or reorient in the industrial system 103 to acquire the image data associated with the desired region of the real-world industrial system.

In certain embodiments, the head mounted device 106 of the virtual reality system 100 may detect a gesture command performed by the remote user 104 to manipulate the visualization 114. For example, the virtual reality system 100 may detect a gesture command performed by the user 104 to rotate the 3D device visualization 102. The head mounted device 106 may analyze characteristics of image data associated with the user's biomechanical movements to determine if the image data matches a characteristic of a gesture command stored, learned, or otherwise interpretable by the head mounted device 106 of the virtual reality system 100. Image data associated with the user's biomechanical movements may include the motion, or lack thereof, of the user's hands, wrists, arms, fingers, or any other suitable body part to distinguish one gesture command from another gesture command. In some embodiments, the head mounted device

106 may acquire the image data and send the image data, via network 108, to a computing system 110 to analyze the characteristics of the image data to determine if the image data matches a characteristic of a gesture command stored, learned, or otherwise interpretable by the computing system 110. It should be noted that any suitable network may be employed in the embodiments described herein. For instance, the network 108 may include any wired or wireless network that may be implemented as a local area network (LAN), a wide area network (WAN), and the like. Indeed, other industrial communication network protocol, such as Ethernet/IP, ControlNet, DeviceNet, and the like, may also be used. In any case, the network 108 may permit the exchange of data in accordance with a protocol.

In some embodiments, the head mounted device 106 may be communicatively coupled to one or more motion sensors attached to the remote user's body. For example, one or more motion sensors may be disposed on the user's hands, wrists, arms, fingers, legs, feet, torso, or any other suitable body part and provide motion data (e.g., body motion capture data) to the head mounted device 106. In one embodiment, based on the received motion data associated with the remote user 104, the head mounted device 106 may analyze the motion data associated with a respective body part of the remote user 104 and determine a gesture command stored, learned, or otherwise interpretable by the head mounted device 106. In another embodiment, the head mounted device 106 may analyze the motion data associated with the respective body part of the remote user 104 and determine a virtual force (e.g., a virtual speed, virtual displacement, or virtual direction) associated with a gesture command performed by the remote user 104. For example, the head mounted device 106 may determine a speed and an angle associated with the movement of the remote user's hand or the user's foot after the remote user 104 performs a rotate gesture command against the 3D visualization 118. The head mounted device 106 may then modify the visualization 114 to display an animation of the rotation of the 3D visualization 118 based on the determined speed and angle associated with the movement of the remote user's hand or foot.

As mentioned above, the computing system 110 may be communicatively coupled to the database 112 that may store 3D video associated with an industrial automation device, a region of the industrial system, or the industrial system. In some embodiments, the database 112 may store a list of gesture commands that are learned or otherwise interpretable by the head mounted device 106 and/or the computing system 110. The database 112 may also store a list of user profiles that include gesture commands that may correspond to specific users 104 of the head mounted device 106.

Figure 2:
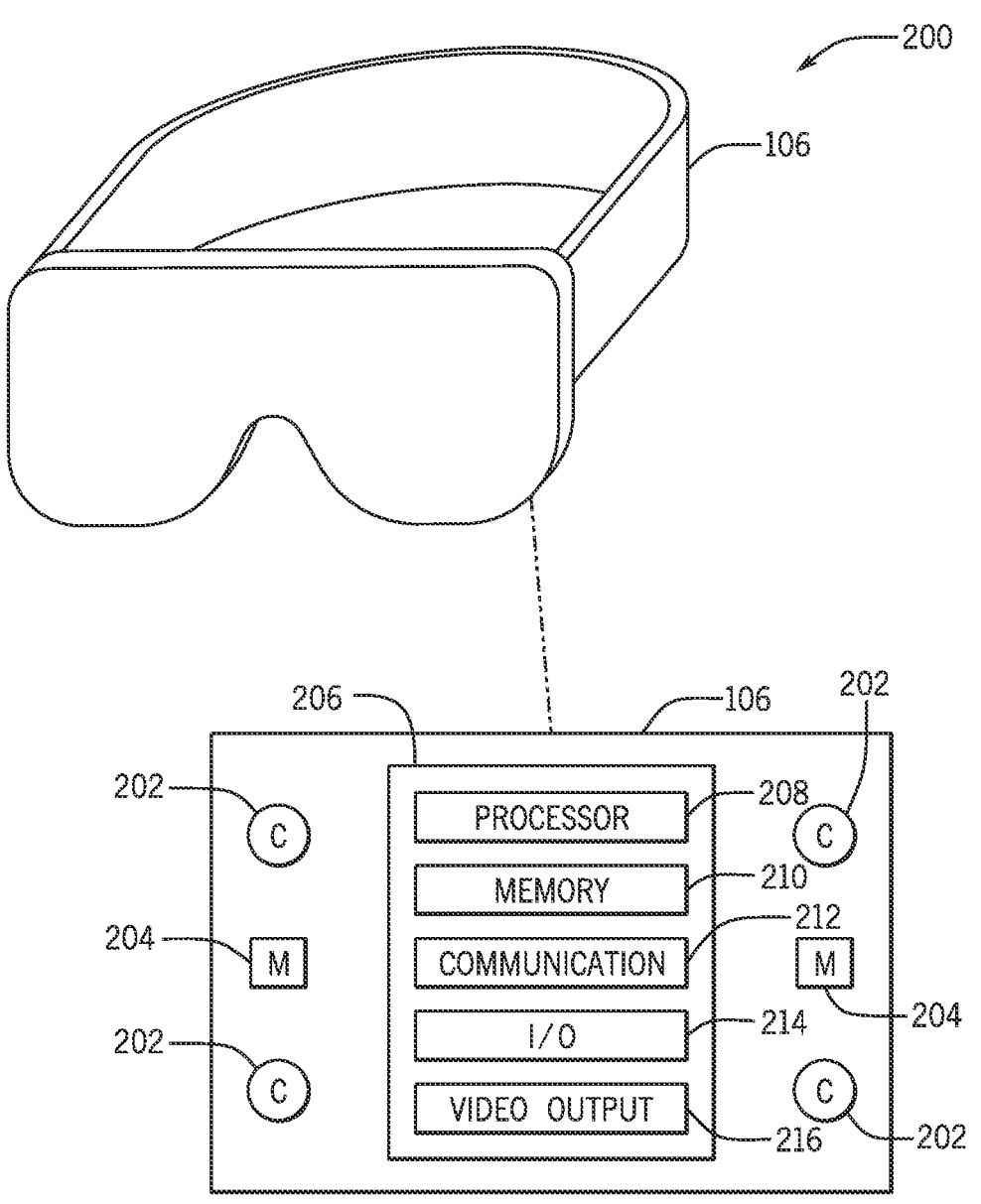
FIG. 2 is a block diagram of an exemplary display device of the VR system, in accordance with an embodiment.

With the foregoing in mind, the head mounted device 106 may include certain components to facilitate the performance of some of the actions set forth above. FIG. 2 is a block diagram 200 of exemplary components within the head mounted device 106. For example, the head mounted device 106 may include one or more cameras 202 and one or more microphones 204. It should be understood that any suitable image-receiving device may be used in place of, or in addition to, the cameras 202, for example, a singular camera 202 may be incorporated into the head mounted device 106. It also should be understood that any suitable sound-receiving device may be used in place of, or in addition to, the microphones 204, for example, a combined speaker and microphone device, or a singular microphone 204 may be incorporated into the head mounted device 106.

In some embodiments, the head mounted device 106 may include one or more sensors for detecting the movements of the remote user 104, the biometrics of the remote user 104, the surroundings of the remote user 104, or the like. For example, the head mounted device 106 may include an infrared sensor, a thermal sensor, a range sensor (e.g., a range camera), a smell sensor (e.g., an electronic nose), or any other suitable sensors for detecting characteristics of the remote user 104 or the surroundings of the remote user 104.

The head mounted device 106 may also include processing circuitry 206 including a processor 208, a memory 210, a communication component 212, input/output (I/O) ports 214, and the like. The communication component 212 may be a wireless or a wired communication component that may facilitate communication between the head mounted device 106 and the computing system 110, the database 112, and the like via the network 108. This wired or wireless communication protocols may include any suitable communication protocol including Wi-Fi®, mobile telecommunications technology (e.g., 2G, 3G, 4G, LTE), Bluetooth®, near-field communications technology, and the like. The communication component 212 may include a network interface to enable communication via various protocols such as Ether-Net/IP®, ControlNet®, DeviceNet®, or any other industrial communication network protocol.

The processor 208 of the head mounted device 106 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 208 may, in some embodiments, include multiple processors. The memory 210 may include any suitable articles of manufacture that serve as media to store processor-executable code, data, and the like. The memory 210 may store non-transitory processor-executable code used by the processor 208 to perform the presently disclosed techniques.

Generally, the head mounted device 106 may receive image data or audio data related to the remote user 104 via one or more image sensors (e.g., cameras 202) or one or more audio sensors (e.g., microphones 204), respectively, communicatively coupled to one or more of the I/O ports 214. Upon receiving image data or audio data, the head mounted device 106, via the processor 208, may interpret the image data or the audio data to determine commands or actions for the head mounted device 106 to perform in response to the determined commands or actions. In some embodiments, the determined command may be forwarded to computing system 110 to interpret the detected image data or audio data. The computing system 110 may analyze characteristics of the image data or the audio data to determine if the image data or the audio data matches the characteristic of a gesture command or verbal command, respectively, stored, learned or otherwise interpretable by the computing system 110.

As mentioned above, the database 112 may store a list of gesture or voice commands that are stored, learned, or otherwise interpretably by the computing system 110. For example, the list of gesture or voice commands may include a rotate command, a zoom in command, a zoom out command, a tilt command, one or more navigational commands (e.g., move left, right, forward, backward), an enlarge command, a compact command, or the like. In another embodiment, instead of forwarding the command to the computing system 110, the head mounted device 106 may be able to analyze characteristics of the image data or the audio data to determine if the image data or the audio data matches the characteristic of a gesture or voice command, respectively, stored, learned, or otherwise interpretable by the head mounted device 106. In any case, the head mounted device 106 or the computing system 110 may analyze characteristics of the remote user's movements in the image data such as the motion of the user's hands, wrists, arms, fingers, or any other suitable body part to distinguish one gesture command from another gesture command. Additionally, the head mounted device 106 or the computing system 110 may analyze characteristics of the audio data, such as frequency (e.g., pitch), amplitude (e.g., loudness), or any other suitable characteristic used to distinguish one verbal command from another verbal command.

As discussed above, the head mounted device 106 may be communicatively coupled to the network 108, which may include an Internet connection, or otherwise suitable wireless or wired communicative coupling to expand its interpretation and functional capabilities, but, in some embodiments, the head mounted device 106 may not rely on such a communicative coupling. In other words, the head mounted device 106 may have particular capabilities that may function without an Internet, wireless, or wired connection. For example, the head mounted device 106 may perform local command interpretation without an Internet or wireless connection.

The head mounted device 106 may also include a video output 216. The video output 216 may be any suitable image-transmitting component, such as a display. For example, the head mounted device 106 may display a visualization 114 associated with the volumetric 3D imaging environment that combines computer-generated content, such as a 3D device visualization 102 of an industrial automation device 103, with real-world content, such as image data associated with the user's physical surroundings. In another example, the head mounted device 106 may have a transparent display and display a visualization 114 of real-world content, computer-generated content, or both, superimposed over the transparent display to produce virtual or 3D objects within real-world surroundings.

Figure 3:
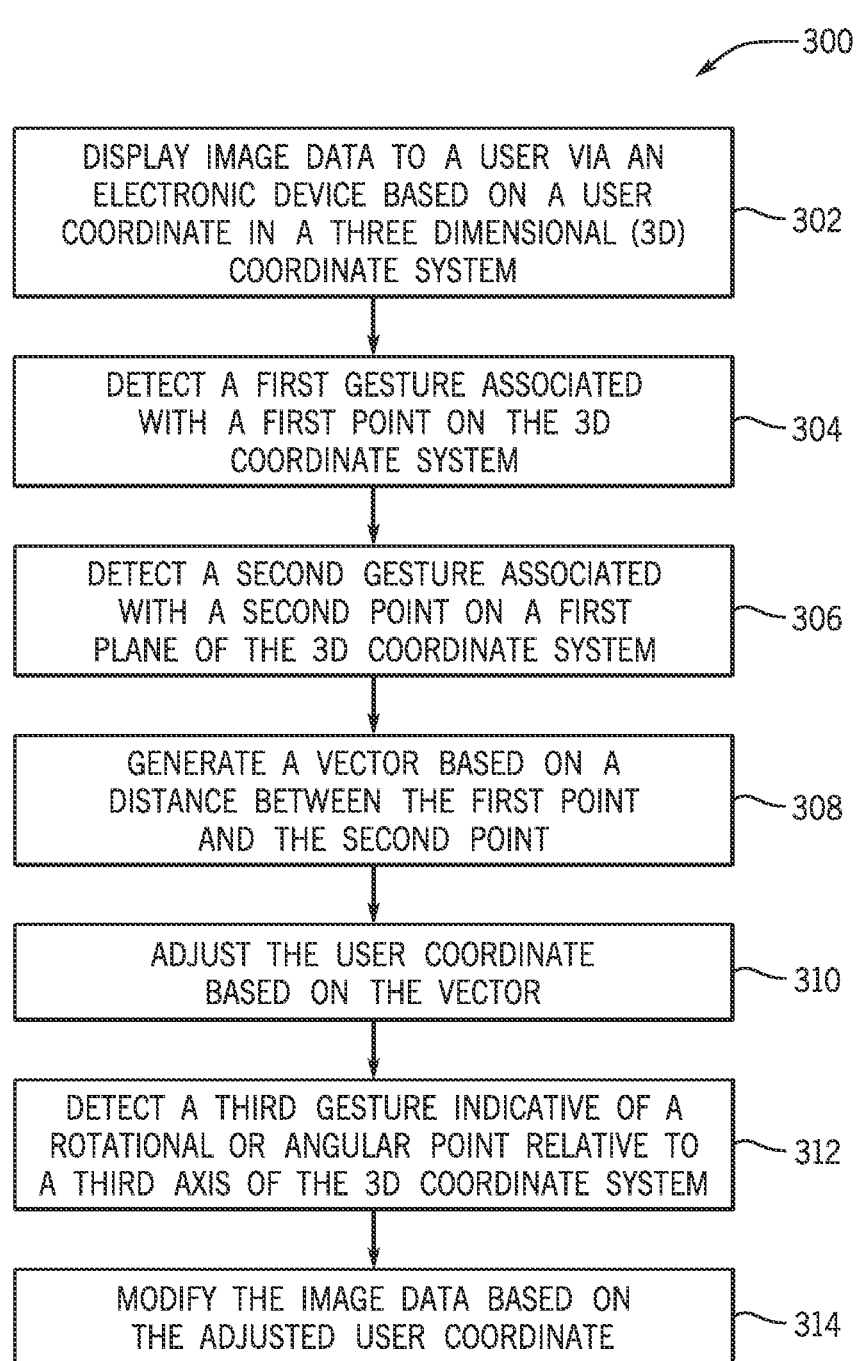
FIG. 3 illustrates a flow chart of a method in which the virtual reality system manipulates the movement and rotation of a user in a VR environment using a vector, in accordance with an embodiment.

FIG. 3 illustrates a flowchart of a method 300 in which the virtual reality system 100 manipulates the movement and rotation of a user in a VR environment using a vector, in accordance with an embodiment. Although the following description of FIG. 3 is discussed as being performed by the virtual reality system 100, it should be understood that any suitable computing device may perform method 300 in any suitable order.

Referring now to FIG. 3, at process block 302, the virtual reality system 100 may display image data to the user 104 via an electronic device based on a user coordinate in a three-dimensional (3D) coordinate system. The image data may include data acquired by the one or more cameras 202 or generated as a virtual environment. In any case, the image data may include representations that corresponds to a user's extremity (e.g., a hand), the VR environment, the user 104, and the like. Further, the image data may be related to a user's directional view and user extremity movement. Therefore, the image data received may be altered by the movement of the user's extremity through the VR environment.

In some embodiments, the virtual reality system 100 may employ gesture detection software (e.g., vision analysis) to interpret a command being conveyed by the user 104 and that may be used to manipulate both the movement and rotation of the user 104 within the VR environment. The gesture detection software may detect gestures associated with the user extremity that include, but are not limited to, grabbing, latching, pinching, pulling, pushing, releasing, twisting, and the like. Additionally, the detected gestures may include those that may be performed by more than one user extremity, such as by the user's left hand or the user's right hand. Further, each finger on the user extremity may be assigned a function. As such, different gestures can be assigned and reassigned to perform various functions for the user 104 while operating within the VR environment.

Figure 4:
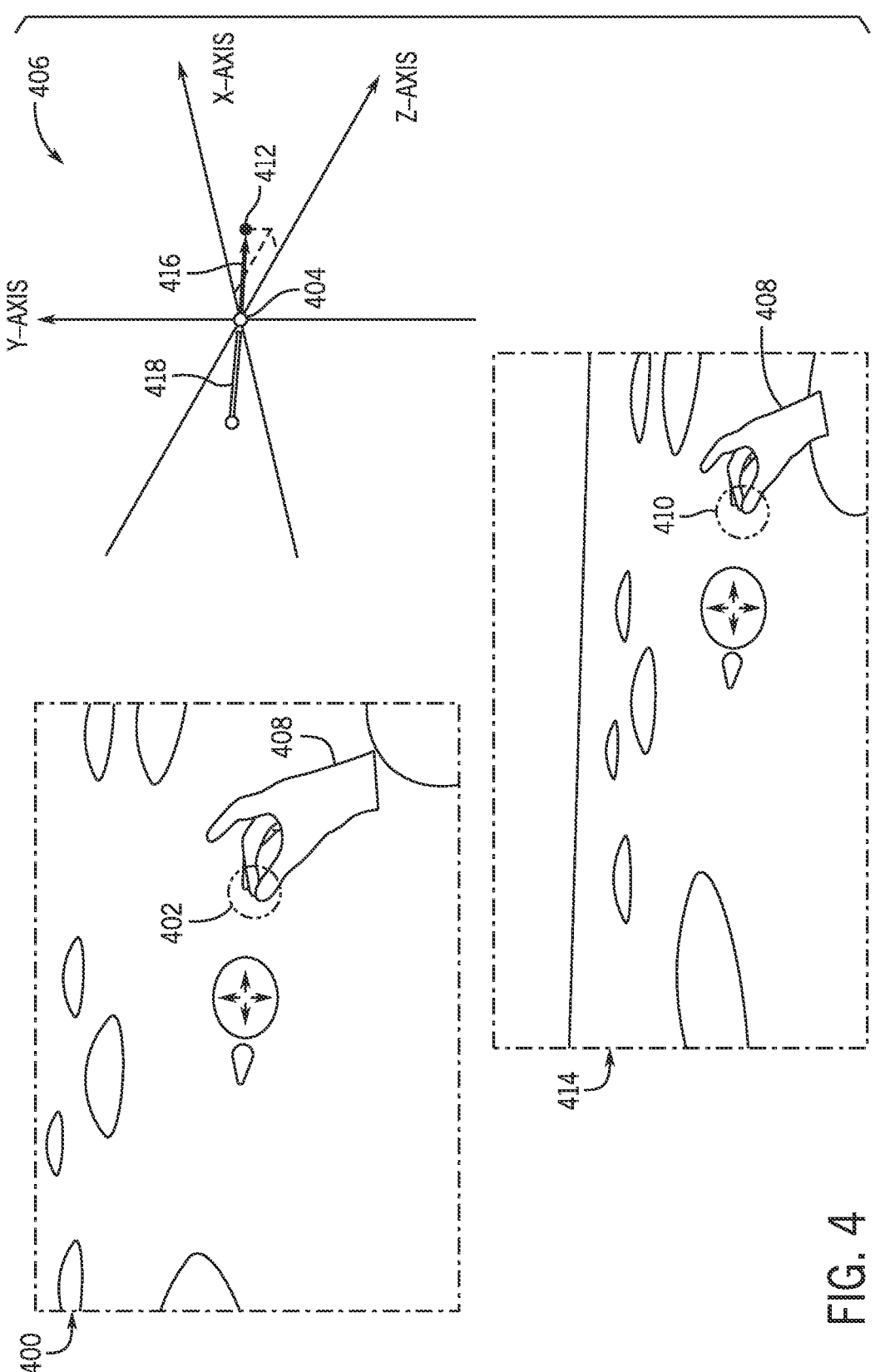
FIG. 4 illustrates an example of the VR environment in which the user's positional movement is manipulated based on the vector, in accordance with an embodiment.

With this in mind, at process block 304, the virtual reality system may detect a first gesture (e.g., movement) 402 associated with a first point (e.g., a first 3D coordinate) 404 of the 3D coordinate system 406. For example, FIG. 4 illustrates a first visualization 400 including the first gesture 402 detected by the virtual reality system 100. As illustrated in FIG. 4, the virtual reality system 100 may detect the first gesture 402 of the user's hand 408 that is indicative of a first point 404 within the 3D coordinate system 406. In particular, the first gesture 402 may depict a user pinching motion (e.g., thumb and index finger pushed together). Upon detecting that the user 104 has made the first gesture 402, the virtual reality system 100 may record the location of the first point 404 within the 3D coordinate system 406 where the first gesture 402 was performed. In some embodiments, the virtual reality system 100 may determine whether the first gesture 402 is complete (e.g., the user 104 releases the first gesture initially performed, matches expected pattern). If the first gesture 402 is completed, the virtual reality system 100 may end the interaction. If the first gesture 402 is being performed, the virtual reality system 100 may proceed to process block 306.

After the virtual reality system 100 detects the first gesture 402, the virtual reality system 100 may proceed to process block 306 and detect a second gesture 410 associated with a second point (e.g., a second 3D coordinate) 412 of the 3D coordinate system 406. The second gesture 410 may be indicative of a movement towards the second point 412 within the 3D coordinate system. For example, as shown in FIG. 4, in a second visualization 414, the user 104 may pull their hand 408 away from the first point 404, generating a pull gesture. It should be noted that the second gesture 410 may include any movement detected along an XYZ coordinate system. For example, the movement towards the second point 412 may be forward, back, left, right, up, and/or down.

Upon detecting the second gesture 410, the virtual reality system 100 may proceed to process block 306 and generate a vector based on a distance between the first point and the second point. The vector may be associated with a magnitude and a direction between the first point and the second point of the 3D coordinate system 406. For example, as shown in FIG. 4, the user 104 may pinch in the space before them and pull their hand back (e.g., away from the initial point) closer to the user 104, thus generating a control vector 416. The control vector 416 may extend from the first point to the second point, and have a direction (e.g., directed from the initial pinch location to the hand 408 of the user 104) and length (e.g., the distance between the initial pinch location and the hand 408 of the user 104).

Further, the virtual reality system 100 may associate the direction and length of the vector with a change in position of the 3D user coordinate within the 3D coordinate system 406. Thus, at process block 310, the virtual reality system 100 may adjust the user coordinate based on the vector (e.g., the control vector 416). As shown in FIG. 4, a movement vector 418 may be generated that mirrors the control vector 416. The movement vector 418 may be indicative of the movement of the user through the 3D coordinate system 406. As mentioned above, the user 104 may pull their hand 408 back closer to the user 104 generating the control vector 416, thus resulting in the user coordinate being adjusted within the 3D coordinate system 406. In an embodiment, the distance of the vector may indicate the speed at which the user coordinate changes within the 3D coordinate system. For example, if the first gesture 402 and the second gesture 410 are both detected closely to one another, the user 104 may move in the desired direction at a lower speed than if the first gesture 402 and the second gesture 410 were detected a larger distance away from one another. As another example, if the first gesture 402 and the second gesture 410 are both detected at a larger distance to one another, the user 104 may move in the desired direction at a higher speed than if the first gesture 402 and the second gesture 410 were detected at the closer distance. In another embodiment, the speed at which the user coordinate changes within the 3D coordinate system may be directly proportional to the distance of the vector.

It should be noted that although we describe the virtual reality system 100 as detecting the first gesture 402 and the second gesture 410, in some embodiments, the virtual reality system may detect only the first gesture. Upon detecting that the user has made the first gesture, the virtual reality system 100 may record the location of the first 3D coordinate within the 3D environment that the first gesture 402 was performed. As the user maintains the performance of the first gesture 402, the virtual reality system 100 may maintain recognition of the first gesture 402. For example, the virtual reality system 100 may detect an initial pinch point of the first gesture 402 and a current pinch point of the first gesture 402. Further, the virtual reality system may generate a vector from the recorded location of the first 3D coordinate to the second 3D coordinate, which indicates where the first gesture 402 is currently being performed (e.g., where the first gesture has moved to in the 3D environment). For example, the user may pinch in the space before them and move their pinched hand to the right. The vector would extend from where the pinch was initially performed to where the pinched hand translated to. The virtual reality system 100 may continue to track the movement of the first gesture 402 until the virtual reality system 100 detects the first gesture has been released (e.g., the user is no longer performing the pinch). As such, the virtual reality system 100 may generate the vector based on the first gesture 402 and movement of the first gesture 402 within the 3D environment without regard to detecting the second gesture 410.

Figure 5:
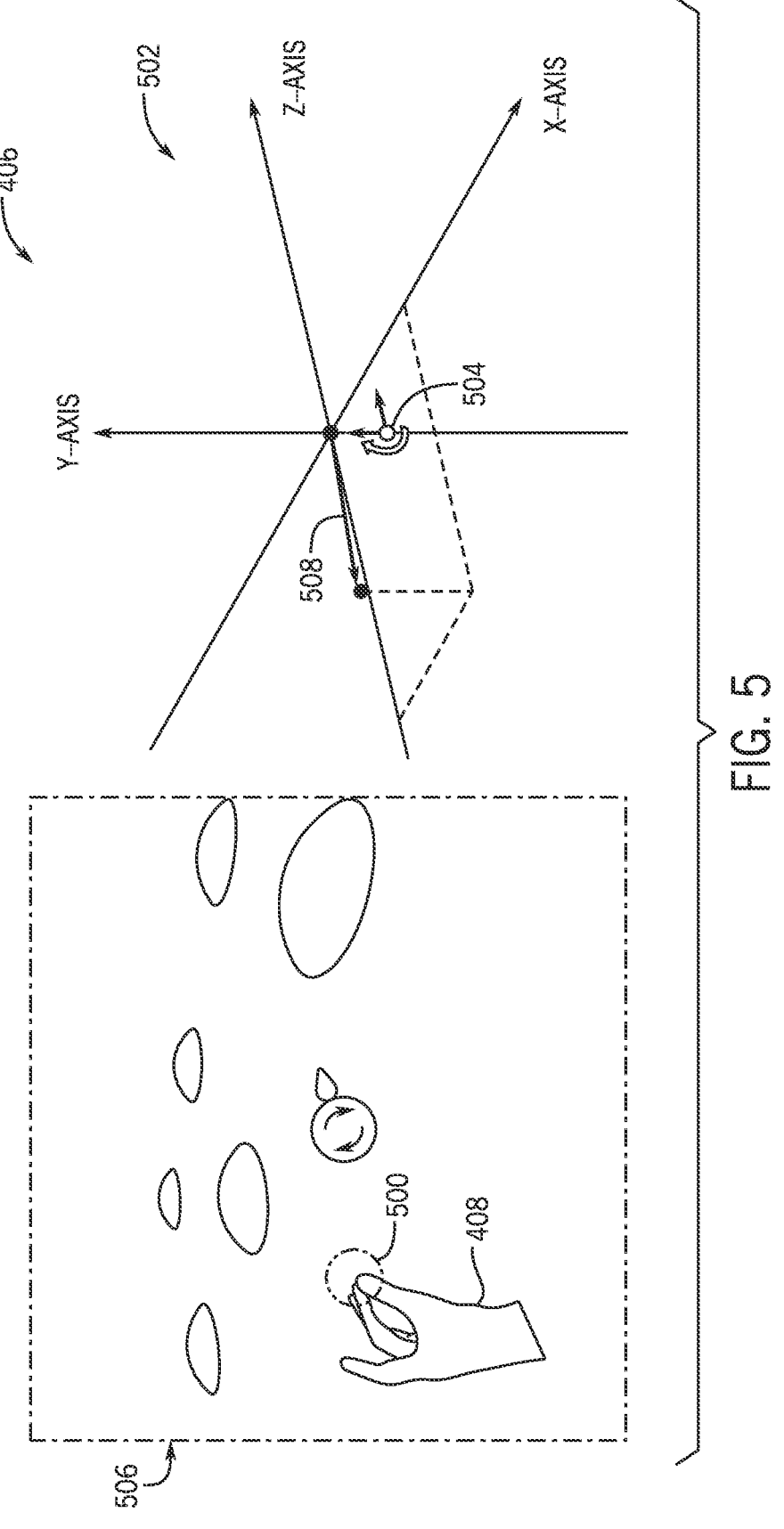
FIG. 5 illustrates an example of the VR environment in which the user's rotational movement is manipulated based on the vector, in accordance with an embodiment.

At process block 312, the virtual reality system 100 may detect a third gesture 500 indicative of a rotational or angular point relative to a first axis (e.g., an x-axis), a second axis (e.g., a y-axis), and/or a third axis (e.g., a z-axis) of the 3D coordinate system 406. That is, as shown in FIG. 5, the virtual reality system 100 may determine if the third gesture 500 is indicative of a movement along the x-axis, the y-axis, and/or the z-axis 502. The movement may be based on possible rotational directions that may be applied to a control vector 504 from the motion of the user's hand 408. Additionally, the control vector 504 may extend from a first point to a second point, and have a direction (e.g., directed from the initial pinch location to the rotated hand 408 of the user 104) and length (e.g., the distance between the initial pinch location and the rotated hand 408 of the user 104). Thus, a movement vector 508 may be generated, which mirrors the control vector 504.

In some embodiments, the virtual reality system 100 may detect a separate gesture, which may correspond to a request to perform a rotational movement (e.g., the user uses their other hand not performing a gesture to perform a gesture). The separate gesture may correspond to a rotational movement along the x-axis, the y-axis, and/or the z-axis 502. For example, if the user is already performing the first gesture 402 with their right hand, the user may perform an additional pinch gesture with their left hand, indicative of rotational movement. The additional pinch gesture may generate a separate control vector, which may enable the rotation of the user. In this manner, rotational control of the 3D user coordinate may be performed independently from the translation of the 3D user coordinate.

It should be noted that, in some embodiments, the control vector 416 may adjust the 3D user coordinate through translation through the 3D coordinate system 406 and through rotation of the 3D coordinate system 406. For example, by performing the third gesture 500 with a left hand of the user 104, the 3D user coordinate may be rotated about a fixed point, whereas performing the first gesture 402 with a right hand of the user prompts the 3D coordinate system 406 to translate the 3D user coordinate while restricting along the x-axis, the y-axis, and/or the z-axis 502.

In some embodiments, the user may rotate and translate the 3D user coordinate simultaneously. For example, the user 104 may be able to perform the third gesture 500 with their left hand and then perform the third gesture 500 with their right hand as well. In this way, the user 104 may generate a first vector and a second vector, where the first vector is associated with the translation of the user 3D coordinate and the second vector is associated with the rotation of the user 3D coordinate.

In addition, it should be noted that the virtual reality system 100 may detect a request to rotate the image data based on a rotational movement of the user's extremity or detected first gesture 402. That is, the virtual reality system 100 may not monitor for additional gestures to cause the image data to rotate. Instead, the movements of the user's extremity with respect to a rotational axis may cause the virtual reality system 100 to rotate the image data.

At process block 314, the virtual reality system 100 may modify the image data based on the adjusted user coordinate. That is, the 3D coordinate system 406 may be associated with the VR environment, such that the translation and rotation within the 3D coordinate system 406 corresponds to movement and rotation within the VR environment. The movement vector (e.g., 418 and 508) may be indicative of the user 104 translation and rotation within the VR environment. As an example, illustrated in FIG. 4, if the 3D user coordinate translates 30 units up and 90 units to the left, then the image data being displayed to the user 104 may depict the user 104 moving through the VR environment 30 units up and 90 units to left (e.g., as shown in the second visualization 414).

As another example, as shown in FIG. 5, if the 3D user coordinate rotates 90 degrees to the left, the image data displayed to the user 104 may depict the user 104 rotating through the VR environment 90 degrees to the left (e.g., as shown in a third visualization 506). In some embodiments, the virtual reality system 100 may employ the gesture detection software to determine whether the user 104 is no longer performing a gesture (e.g., the first gesture 402, the second gesture 410, and/or the third gesture 500) and may stop translation or rotation of the user 104 though the VR environment based on the determination. For instance, if the virtual reality system determines the user 104 is no longer performing the second gesture 410, then the virtual reality system 100 may stop modifying the image data based on the adjusted user coordinate related to translation. As another example, if the virtual reality system 100 determines the user 104 is no longer performing the third gesture 500, then the virtual reality system 100 may stop modifying the image data based on the adjusted user coordinate related to rotation.

Through the use of the present disclosure, moving within the VR environment may be accomplished without requiring the user 104 to hold a physical controller, instead allowing their body to act as a means of moving and rotating in order to visualize the VR environment. In this way, the corresponding image data displayed to the user 104 may be received intuitively and without the strain and limitation placed on movement with traditional VR systems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:

receiving, via at least one processor, three-dimensional (3D) video data from one or more image sensors disposed in an industrial system;

generating, via the at least one processor, image data associated with a virtual reality visualization of the industrial system based on the 3D video data, wherein the image data comprises a plurality of 3D representations of industrial devices for use in the industrial system;

displaying, via the at least one processor, the image data to a user via an electronic device based on a 3D user coordinate in a 3D coordinate system of the virtual reality visualization;

detecting, via the at least one processor, a first gesture associated with an extremity of the user and a first 3D coordinate of the 3D coordinate system;

detecting, via the at least one processor, a movement of the extremity in the 3D coordinate system, from the first 3D coordinate to a second 3D coordinate of the 3D coordinate system;

generating, via the at least one processor, a vector based on the movement, a distance between the first 3D coordinate and the second 3D coordinate, and direction of the movement;

adjusting, via the at least one processor, the 3D user coordinate based on the vector;

receiving, via the at least one processor, updated 3D video data from the one or more image sensors in response to adjusting the 3D user coordinate, wherein the updated 3D video data corresponds to the adjusted 3D user coordinate; and modifying, via the at least one processor, the image data based on the adjusted 3D user coordinate and the updated 3D video data with respect to the virtual reality visualization.

2. The method of claim 1, comprising:

detecting a rotation of the extremity; and rotating the image data based on the rotation of the extremity.

3. The method of claim 1, wherein the first gesture comprises a pinch gesture.

4. The method of claim 1, wherein the first gesture is performed relative to a first plane, a second plane, a third plane, or any combination thereof.

5. The method of claim 1, comprising:

detecting a second gesture of an additional extremity of the user;

determining a rotation angle based on the second gesture; and adjusting a view of the adjusted 3D user coordinate based on the rotational angle.

6. The method of claim 1, wherein the distance corresponds to a speed in which the first 3D coordinate is adjusted.

7. The method of claim 6, wherein the speed is directly proportional to the distance.

8. A tangible, non-transitory, computer-readable medium configured to store instructions executable by at least one processor in a computing device, wherein the instructions are configured to cause the at least one processor to:

receive three-dimensional (3D) video data from one or more image sensors disposed in an industrial system;

generate image data associated with a virtual reality visualization of the industrial system based on the 3D video data, wherein the image data comprises a plurality of 3D representations of industrial devices for use in the industrial system;

display the image data to a user via an electronic device based on a 3D user coordinate in a 3D coordinate system of the virtual reality visualization;

detect a first gesture associated with a first 3D coordinate of the 3D coordinate system;

detect a second gesture associated with a second 3D coordinate of the 3D coordinate system;

generate a vector based on a distance and direction between the first 3D coordinate and the second 3D coordinate;

adjust the 3D user coordinate based on the vector;

receive updated 3D video data from the one or more image sensors in response to adjusting the 3D user coordinate, wherein the updated 3D video data corresponds to the adjusted 3D user coordinate; and modify the image data based on the adjusted 3D user coordinate and the updated 3D video data with respect to the virtual reality visualization.

9. The computer-readable medium of claim 8, wherein the instructions to modify the image data are configured to cause the processor to:

detect a third gesture; and rotate the image data based on the third gesture.

10. The computer-readable medium of claim 9, wherein the first gesture comprises a pinch gesture, the second gesture comprises a pull gesture, and the third gesture comprises a rotational gesture.

11. The computer-readable medium of claim 9, wherein the first gesture is performed relative to a first plane and the second gesture is performed relative to a second plane different from the first plane.

12. The computer-readable medium of claim 8, wherein the instructions to modify the image data based on the adjusted 3D user coordinate are configured to cause the processor to:

generate an additional vector based on the vector, wherein the additional vector mirrors the vector; and adjust the first 3D coordinate based on the additional vector.

13. The computer-readable medium of claim 8, wherein the distance corresponds to a speed in which the first 3D coordinate is adjusted.

14. A system, comprising:

an image sensor disposed in an industrial system configured to capture three-dimensional (3D) video data;

a computing device configured to generate a virtual 3D environment based on the 3D video data; and a processor configured to perform operations comprising:

generating image data associated with a virtual reality visualization of the industrial system based on the 3D video data, wherein the image data comprises a plurality of 3D representations of industrial devices for use in the industrial system;

displaying the image data to a user via an electronic device based on a 3D user coordinate in a 3D coordinate system of the virtual reality visualization;

detecting a first gesture associated with a first 3D coordinate of the 3D coordinate system;

detecting a second gesture associated with a second 3D coordinate of the 3D coordinate system;

generating a vector based on a distance and direction between the first 3D coordinate and the second 3D coordinate;

adjusting the 3D user coordinate based on the vector;

receiving updated 3D video data from the image sensor in response to adjusting the 3D user coordinate, wherein the updated 3D video data corresponds to the adjusted 3D user coordinate; and modifying the image data based on the adjusted 3D user coordinate and the updated 3D video data with respect to the virtual reality visualization.

15. The system of claim 14, wherein the processor is configured to perform the operations comprising:

detecting a third gesture; and rotating the image data based on the third gesture.

16. The system of claim 15, wherein the processor is configured to perform the operations comprising:

detecting that the first gesture, the second gesture, or the third gesture is no longer being performed; and stopping at least a portion of the adjustment of the 3D user coordinate in response to detecting that the first gesture, the second gesture, or the third gesture is no longer being performed.

17. The system of claim 15, wherein rotating the image data comprises rotating the image data around a fixed point.

18. The system of claim 15, wherein the first gesture comprises a pinch gesture, the second gesture comprises a pull gesture, and the third gesture comprises a rotational gesture.

19. The system of claim 14, wherein the processor is configured to perform the operations comprising:

generating an additional vector based on the vector, wherein the additional vector mirrors the vector; and adjusting the first 3D coordinate based on the additional vector.

20. The system of claim 14, wherein the distance corresponds to a speed in which the first 3D coordinate is adjusted.

\* \* \* \* \*